(12) United States Patent
Townsend

(10) Patent No.: US 10,473,764 B2
(45) Date of Patent: Nov. 12, 2019

(54) PROXIMITY SENSOR PACKAGE HAVING ONE OR MORE GROOVES IN A MODULE CAP

(71) Applicant: STMICROELECTRONICS (RESEARCH & DEVELOPMENT) LIMITED, Marlow (GB)

(72) Inventor: Christopher Townsend, Edinburgh (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 290 days.

(21) Appl. No.: 15/445,319

(22) Filed: Feb. 28, 2017

(65) Prior Publication Data

US 2018/0246209 A1    Aug. 30, 2018

Related U.S. Application Data

(60) Provisional application No. 62/464,249, filed on Feb. 27, 2017.

(51) Int. Cl.
G01S 7/48      (2006.01)
G01S 7/481     (2006.01)
G01S 17/02     (2006.01)

(52) U.S. Cl.
CPC .......... *G01S 7/4813* (2013.01); *G01S 17/026* (2013.01)

(58) Field of Classification Search
CPC ......... H03K 17/941; H03K 2017/9455; H03K 2217/94108; H01L 31/125; H01L 31/173; H01L 25/167; H01L 2924/0002; H01L 2924/00
See application file for complete search history.

(56) References Cited

U.S. PATENT DOCUMENTS

2010/0327164 A1*  12/2010  Costello ............ G01D 5/34715
                                                         250/338.1
2012/0133956 A1*   5/2012  Findlay ................ H03K 17/941
                                                         356/614

* cited by examiner

*Primary Examiner* — Luke D Ratcliffe
(74) *Attorney, Agent, or Firm* — Slater Matsil, LLP

(57) ABSTRACT

A sensor package may include a source configured to emit a signal, a detector configured to receive a first reflection of the signal, and an isolator disposed between the source and the detector, where a surface of the isolator has one or more grooves configured to direct a second reflection of the signal away from the detector.

20 Claims, 5 Drawing Sheets

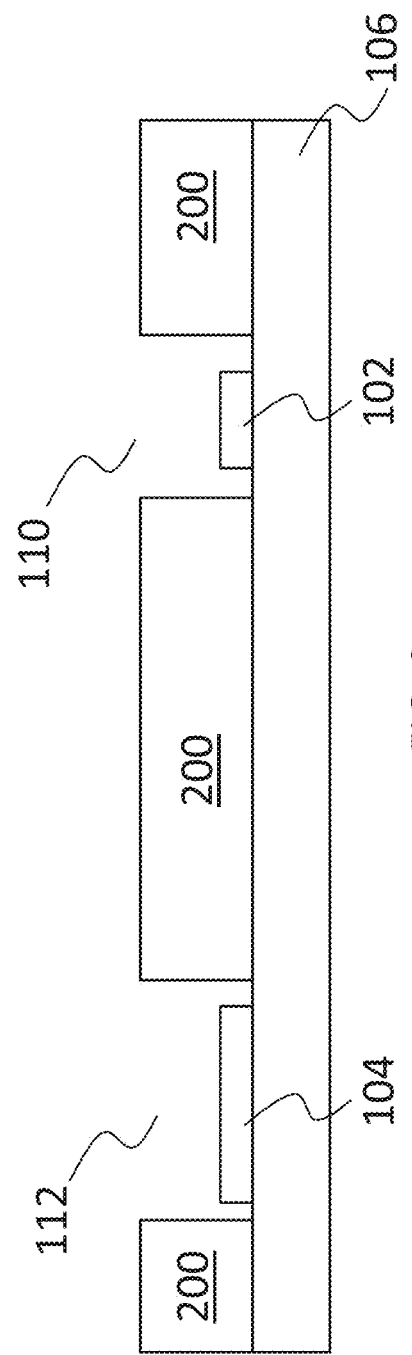

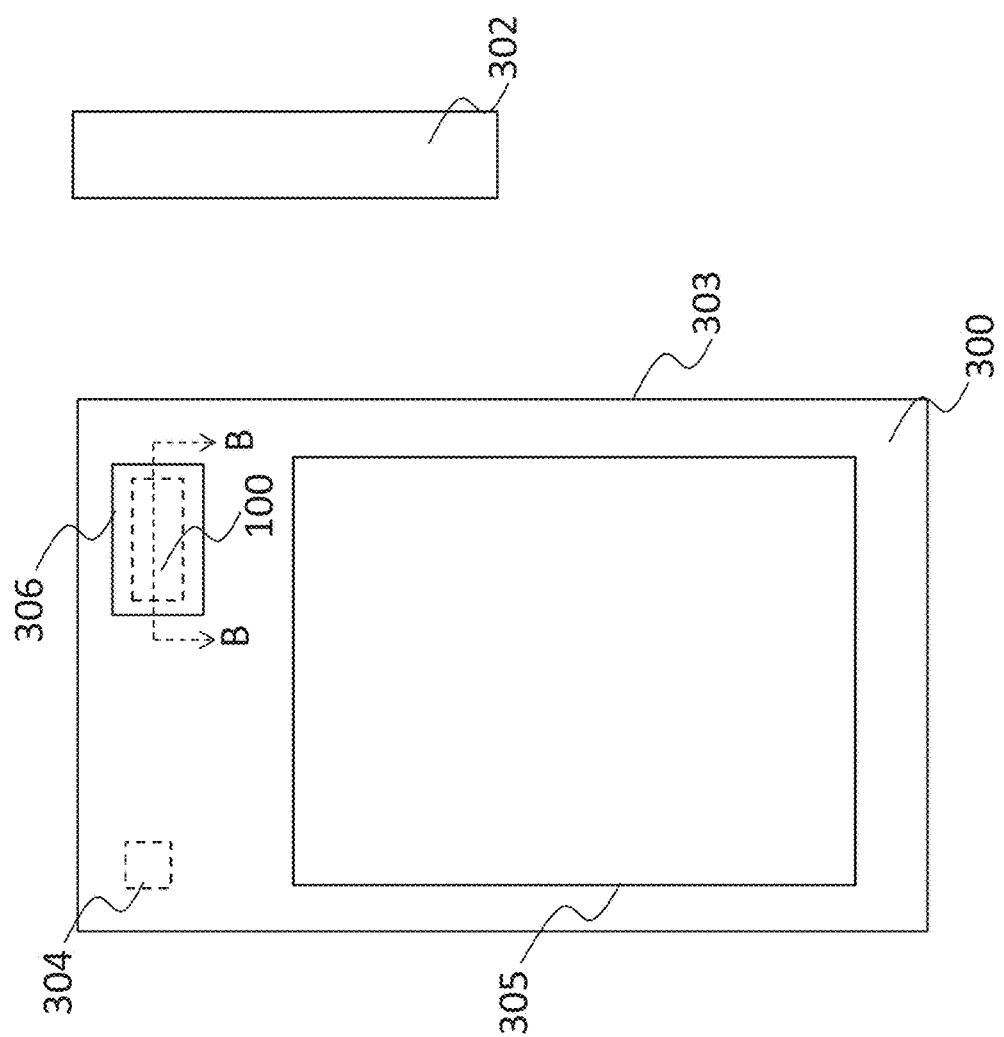

PROXIMITY SENSOR PACKAGE HAVING ONE OR MORE GROOVES IN A MODULE CAP

CROSS-REFERENCE TO RELATED APPLICATIONS

The application claims the benefit of U.S. Provisional Application No. 62/464,249 filed Feb. 27, 2017 and entitled "Proximity Sensor Package Having One or More Grooves in a Module Cap," which application is hereby incorporated herein by reference.

TECHNICAL FIELD

The present disclosure relates generally to a sensor, and, in particular embodiments, to a proximity sensor package having one or more grooves in a module cap.

BACKGROUND

Proximity or time-of-flight sensors typically include a radiation source (e.g. a photon source) and a corresponding detector. In some examples, the detector may include a number of exposed radiation sensitive pixels (e.g. from a single pixel up to, for example, a 10×10 pixel array). At its simplest the proximity or time-of-flight sensor is capable of indicating the presence or absence of a user or object. Additional computation and circuit complexity can provide enhanced data such as the range to an object.

Proximity or time-of-flight sensing is achieved by emitting radiation (e.g. photons) from the source; capturing radiation which is reflected back to the detector by an object; and processing the reflected radiation to determine the proximity of the object to the sensor. Proximity or time-of-flight sensors are used in many applications, including on mobile communications devices and vehicle parking sensors. Accurate and efficient proximity or time-of-flight sensors may be desirable.

SUMMARY

In an embodiment, a sensor package may include a source configured to emit a signal; a detector configured to receive a first reflection of the signal; and an isolator disposed between the source and the detector, where a surface of the isolator has one or more grooves configured to direct a second reflection of the signal away from the detector.

In an embodiment, a device may include a sensor package. The sensor package may include a sensor package, including an optical source configured to emit a beam of photons; an optical detector configured to receive a reflection of the beam of photons off an object external to the device; and a module cap encompassing the optical source and the optical detector and defining an exterior surface of the sensor package, where the module cap has a portion disposed between the optical source and the optical detector, the portion of the module cap having at least one surface directed away from the optical detector.

In an embodiment, a method may include disposing a source, configured to emit a beam of radiation, over a substrate; disposing a detector, configured to receive a first reflection of the beam of radiation, over the substrate; and disposing an isolation structure between the source and the detector, the isolation structure including one or more surfaces having a one or more surface normals directed away from the detector.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 shows a cross-sectional view of the sensor package shown in FIG. 1, in accordance with various embodiments;

FIG. 3A shows a schematic of a device including the sensor package shown in FIGS. 1 and 2, in accordance with an embodiment;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Packaging a radiation source (e.g. a photon source) and a detector of a proximity or time-of-flight sensor in a single package allows both the source and the detector to be controlled by common circuitry. This may reduce the complexity of the sensor package. In addition, the sensor package may provide a single working entity to a customer, thereby avoiding the comparatively larger footprint of separately-packaged sources and detectors. However, there may be a possibility that radiation (e.g. photons) emitted by the source may propagate within the sensor package from the source to the detector. This phenomenon, known as crosstalk, can pollute the response of the radiation detector to the reflected radiation it captures during proximity detection or time-of-flight calculation. Packaging solutions are therefore required which either minimize or substantially prevent crosstalk.

Figure 1:
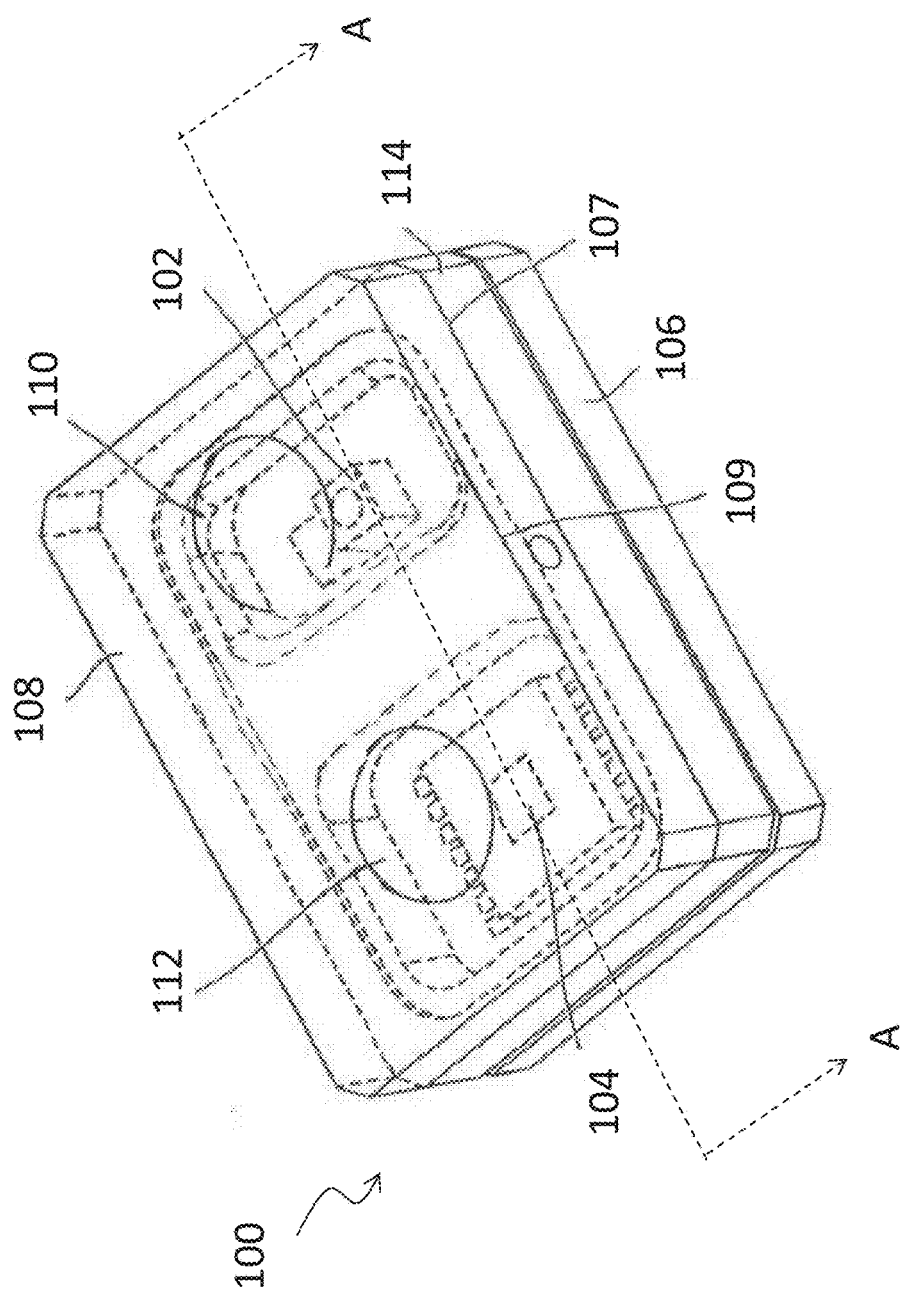
FIG. 1 shows a perspective view of a sensor package, in accordance with an embodiment.

FIG. 1 is a perspective view of a sensor package 100, in accordance with an embodiment. The sensor package 100 may be used to detect the proximity or presence of an object to a device that includes the sensor package 100. For example, a mobile communications device may include the sensor package 100, and the sensor package 100 may be used by the mobile communications device to detect the proximity of an object (e.g. a human hand) to the mobile communications device.

The sensor package 100 may include a source 102 (also referred to as a transmitter or an emitter) and a detector 104 (also referred to as a receiver) mounted on (and optionally bonded to) a substantially planar attachment pad 106. A module cap 108 having a first aperture no and a second aperture 112 is fitted to a module mount 114, which extends around the perimeter of the attachment pad 106. In some embodiments, the source 102 may be a photon source and the module mount 114 may include a material that is opaque to photons emitted by the source 102. The module mount 114 may be bonded to the attachment pad 106. The source 102 or the detector 104 need not necessarily be mounted directly to the attachment pad 106. However, the source 102 and the detector 104 are typically held in a fixed relation to the attachment pad 106.

The source 102 may be an optical source such as an infrared source, a modulated light emitting diode (LED), or a semiconductor laser, although other optical sources may be possible as well. The detector 104 may include a single radiation sensitive pixel or a plurality of radiation sensitive pixels (e.g. silicon photodiodes configured in conductive mode, or single photon avalanche detectors). In an example where the detector 104 is a single photon avalanche detector (SPAD), the detector 104 may include, or may be, a p-n junction device biased beyond its breakdown region. The high reverse bias voltage generates a sufficient magnitude of electric field such that a single charge carrier introduced into the depletion layer of the device can cause a self-sustaining avalanche via impact ionization. The avalanche is quenched, either actively or passively, to allow the device to be "reset" to detect further photons. The initiating charge carrier can be photo-electrically generated by a single incident photon striking the high field region. The sensor package 100 further includes common circuitry (not shown in FIG. 1) housed within the module cap 108. Such common circuitry may be used to control the source 102 and the detector 104 and to set up the timing of the signal (e.g. optical signal) emission and detection. The circuitry can also be used to apply a modulation signal to the source 102.

Figure 3B:
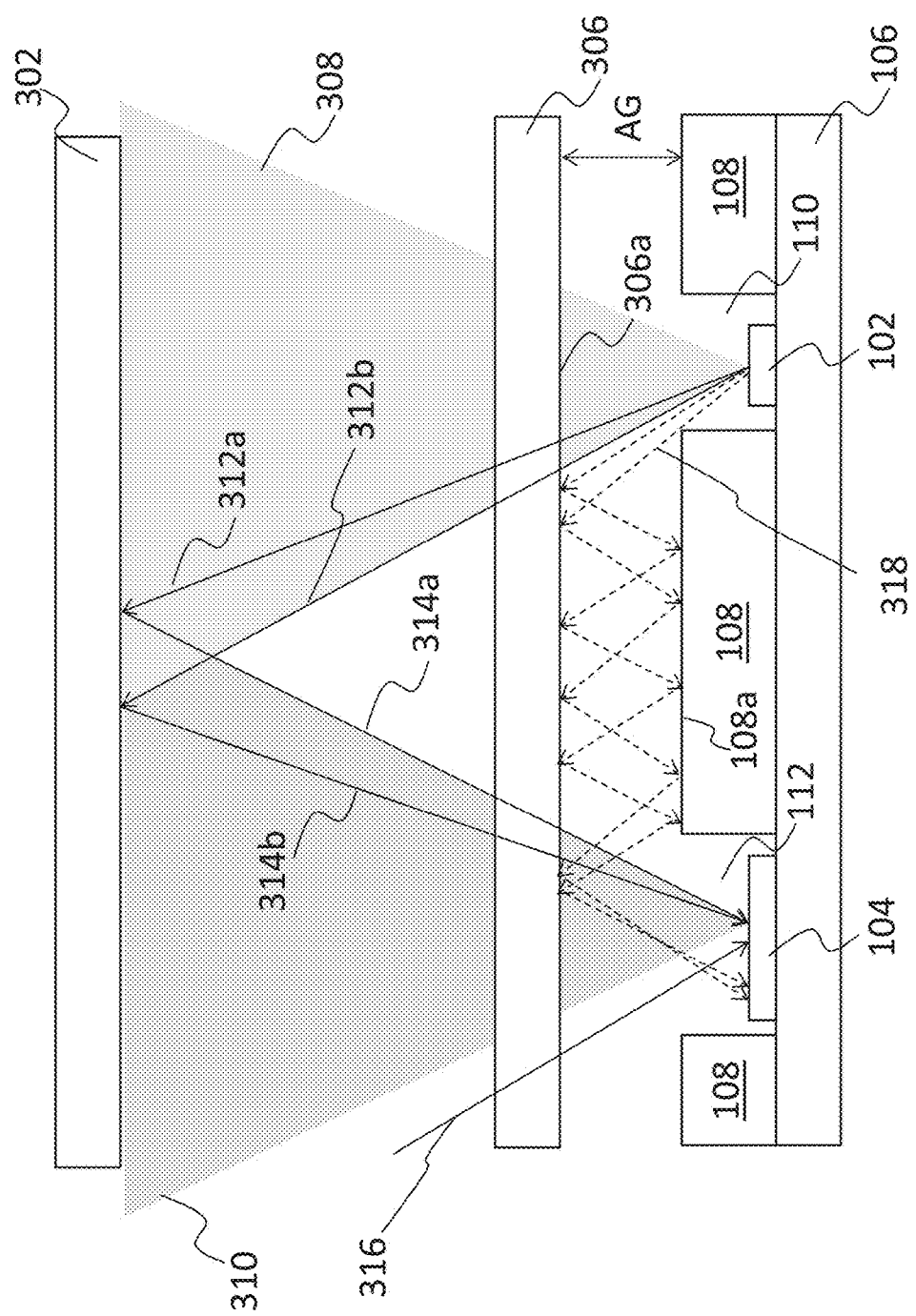
FIG. 3B shows a cross-sectional view of a portion of the device shown in FIG. 3A, in accordance with an embodiment.

The module cap 108 may be positioned over the attachment pad 106. More specifically, the first aperture no may be positioned over the source 102 and the second aperture 112 may be positioned over the detector 104. The first aperture no may function to limit photons emitted by the source 102 to an emission cone 308 of the sensor package 100, as shown in FIG. 3B), while the second aperture 112 may function to define an incident viewing cone 310 (or a field of view) of the sensor package 100, as shown in FIG. 3B. The module cap 108 may be formed as a single part before being fitted to the module mount 114 in a single assembly step. As an example, a lower surface 107 of the module cap 108 may be in physical contact with the module mount 114., while an upper surface 109 of the module cap 108 may be a topmost surface of the sensor package 100. This single part construction ensures that alignment accuracy is maintained between the emission and incident viewing cones 308 and 310 of the first and second apertures 110 and 112, respectively (and thus, those of the source 102 and the detector 104, respectively). The module cap 108 may, in some examples, be formed by encapsulating the attachment pad 106, the source 102, the detector 104, and the module mount 114 with an optical encapsulant (such as epoxy or silicone). Such an example is shown in FIG. 2, which depicts a cross-sectional view of the sensor package 100, in accordance with various embodiments. The cross-sectional view shown in FIG. 2 may be taken along the line A-A shown in FIG. 1. In the example shown in FIG. 2, the source 102 and the detector 104 are disposed in respective openings of an optical encapsulant 200 that functions as the module cap 108. The respective openings of the optical encapsulant 200 respectively define the first aperture no and the second aperture 112 of the sensor package 100. In the example depicted in FIG. 2, the source 102 and the detector 104 are separate components; however, in other embodiments, the source 102 and the detector 104 may be supported by the same semiconductor substrate.

FIGS. 3A and 3B show various views of a device 300 including the sensor package 100, in accordance with an embodiment. In particular, FIG. 3A shows a schematic of the device 300 including the sensor package shown in FIGS. 1 and 2, while FIG. 3B shows a cross-sectional view of the device 300 shown in FIG. 3A, taken along a line B-B. As described above, the sensor package 100 may be used to detect the proximity, presence, or distance of an object 302 to the device 300. The device 300 may be a cell phone, a game console, a digital tablet, a laptop computer, an infant-monitoring device (e.g. a baby monitor camera), or a motion-activated camera, although other devices may be possible. The device 300 may include a housing 303 that defines an exterior surface of the device 300. The device 300 may include a controller 304 and the sensor package 100 disposed within the housing 303. In embodiments where the device 300 is a cell phone, laptop computer, digital tablet or the like, the device 300 may additionally include a display 305. The device 300 may include a window 306 over the sensor package 100. The window 306 allows the source 102 to emit photons from the device 300, and this is depicted in FIG. 3B as emission cone 308. The window 306 also allows signals (e.g. optical reflections or ambient light) to be received by the detector 104. In general the detector 104 may be sensitive to signals received within an incident viewing cone 310, which may define the field of view of the sensor package 100 (e.g. as shown in FIG. 3B). In some embodiments, the window 306 may be a cover glass of the device 300 (e.g. in an example where the device 300 is a cell phone having a touchscreen display).

In general, the controller 304 activates the source 102 to emit beams of photons 312a, 312b within the emission cone 308, as shown in FIG. 3B. The transmitted beams of photons 312a, 312b penetrate the window 306, reach the object 302, and are reflected (e.g. partially reflected) by the object 302. Reflected beams of photons 314a, 314b (which may be within the incident viewing cone 310) return to the sensor package 100 by penetrating the window 306 and reaching the detector 104 through the second aperture 112. As depicted in FIG. 3B, ambient light 316 within the incident viewing cone 310 may also be detected by the detector 104. The distance between the device 300 and the object 302 may be determined from the speed of light and time-of-flight. In particular, when the device 300 is about 1 centimeter from the object 302, the reflected beams of photons 314a, 314b may be received by the detector 104 about 66 picoseconds after the transmitted beams of photons 312a, 312b are emitted from the source 102. As such, the distance between the device 300 and the object 302 may be determined (e.g. by a processor included within the device 300) from the time elapsed between emission of the transmitted beams of photons 312a, 312b (e.g. by the source 102) and reception of the reflected beams of photons 314a, 314b (e.g. by the detector 104). Since a determination of the proximity, presence, or distance of the object 302 from the device 300 is based on photon travel time, such a determination may be independent of the reflectance of the object 302 and substantially immune to ambient illumination and optical path variations introduced by the window 306 or the housing 303 of the device 300.

FIG. 3B shows an airgap AG disposed between window 306 and the sensor package 100. As depicted in FIG. 3B, the source 102 may emit a beam of photons 318 that exits the first aperture no and propagates through the airgap AG separating the sensor package 100 and the window 306. This parasitic beam of photons 318 creates crosstalk between the source 102 and the detector 104. The beam of photons 318 shown in FIG. 3B illustrates one possible crosstalk path between the source 102 and the detector 104. In general, a crosstalk path may be a path formed by a photon emitted by the source 102, reflected off the surface 306a of the window 306 directed towards the sensor package 100, and received at the detector 104. In some instances, such as in the example shown in FIG. 3B, the photon additionally reflects off the surface 108a of the module cap 108 directed towards the window 306, and the reflection of the photon between the surfaces 108a and 306a continues until the photon is received at the detector 104. Crosstalk is detrimental to the performance of the sensor package 100 since the detector 104 may erroneously determine the proximity, presence, or distance of the object 302 from the device 300 based on the parasitic beam of photons 318. It may be desirable to provide a structure, included in the sensor package 100, configured to eliminate or substantially reduce crosstalk between the source 102 and the detector 104.

Figure 4:
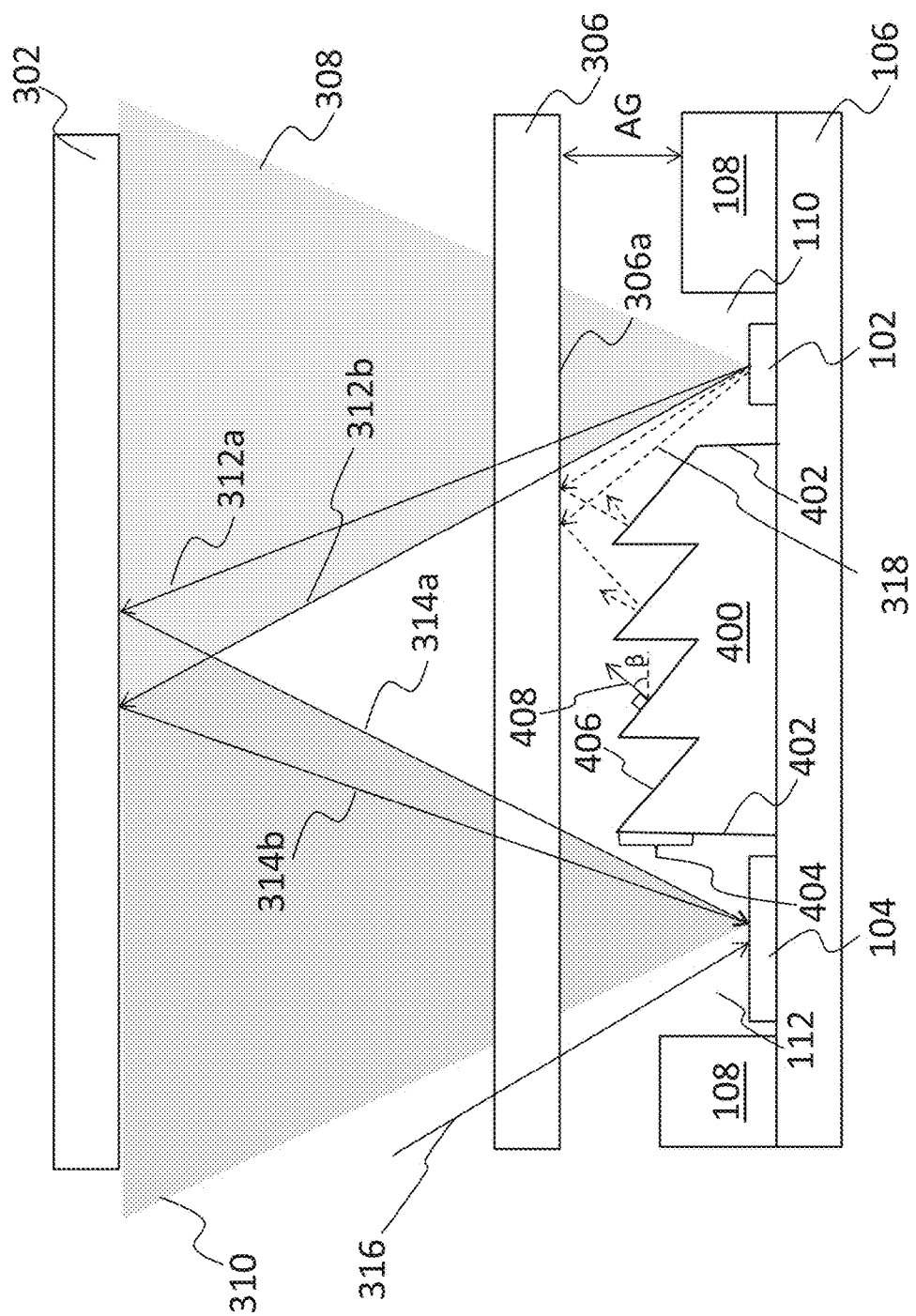
FIG. 4 shows a cross-sectional view of a sensor package including a module cap having surfaces configured to direct radiation away from a detector, in accordance with an embodiment.

FIG. 4 shows a cross-sectional view of a sensor package 100 including a module cap 400 having surfaces configured to direct radiation (e.g. photons) away from the detector 104, in accordance with an embodiment. As shown in FIG. 4, the module cap 400 is disposed between the source 102 and the detector 104, and sidewalls 402 of the module cap 400 may define at least a portion of the first aperture no and the second aperture 112. The module cap 400 may include an upper region 404 proximal the airgap AG and the window 306 (e.g. cover glass) of the device 300. The upper region 404 of the module cap 400 may include one or more grooves 406. In the example shown in FIG. 4, the one or more grooves 406 are illustrated as a saw-tooth structure at the upper region 404 of the module cap 400. However, other shapes may be possible as well. The one or more grooves 406 act as an optical isolator for substantially preventing the propagation of a beam of photons from the source 102 to the detector 104 along an optical path within the airgap AG separating the sensor package 100 and the window 306. Similar to the embodiment shown in FIG. 3B, the source 102 may emit the beam of photons 318 that exits the first aperture 110. However, the one or more grooves are shaped to prevent the beam of photons 318 from being reflected by the window 306 back into the second aperture 112. This effect may be achieved by configuring the one or more grooves 406 to have a surface normal 408 directed away from the detector 104. As an example, an angle β subtended between the surface normal 408 of the one or more grooves 406 and a plane occupied by the source 102 may be less than about 90 degrees (e.g. between about 30 degrees and 45 degrees). In other words, the one or more grooves 406 may be angled to reflect incident photons away from a region or portion of the sensor package 100 in which the detector 104 is disposed. Consequently, photon reflections off the surfaces of the one or more grooves 406 can be biased away from the detector 104, thereby reducing crosstalk.

In some embodiments, it may be desirable that the photon reflections off the surfaces of the one or more grooves 406 be specular reflections rather than diffuse reflections. Consequently, in an embodiment where the module cap 400 includes a plurality of grooves 406 (such as in the example of FIG. 4), the surface normals 408 of the grooves 406 may be parallel to each other. Additionally or alternatively, the exterior surfaces of the one or more grooves 406 may have a smooth finish (e.g. target smoothest surface finish possible, such as less than charmille 5). As an example, the one or more grooves 406 may have highly polished exterior surfaces and/or may include LA121 (or a material having similar mechanical properties to LA121).

In an embodiment, a sensor package may include a source configured to emit a signal; a detector configured to receive a first reflection of the signal; and an isolator disposed between the source and the detector, where a surface of the isolator has one or more grooves configured to direct a second reflection of the signal away from the detector.

In an embodiment, a device may include a sensor package. The sensor package may include a sensor package, including an optical source configured to emit a beam of photons; an optical detector configured to receive a reflection of the beam of photons off an object external to the device; and a module cap encompassing the optical source and the optical detector and defining an exterior surface of the sensor package, where the module cap has a portion disposed between the optical source and the optical detector, the portion of the module cap having at least one surface directed away from the optical detector.

In an embodiment, a method may include disposing a source, configured to emit a beam of radiation, over a substrate; disposing a detector, configured to receive a first reflection of the beam of radiation, over the substrate; and disposing an isolation structure between the source and the detector, the isolation structure including one or more surfaces having a one or more surface normals directed away from the detector.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A sensor package, comprising:
   an attachment pad;
   a source attached to the attachment pad and configured to emit a signal;
   a detector attached to the attachment pad and configured to receive a first reflection of the signal;
   an optical encapsulant encapsulating the attachment pad, the source, and the detector, the optical encapsulant comprising an exposed outer surface of the sensor package;
   a first aperture disposed over the source and extending completely through the optical encapsulant to the outer surface, the first aperture comprising first sidewalls extending away from a major surface of the source; and
   a second aperture disposed over the detector and extending completely through the optical encapsulant to the outer surface, the second aperture comprising second sidewalls extending away from a major surface of the detector, wherein the optical encapsulant comprises an isolator disposed between the source and the detector, a surface of the isolator having a plurality of grooves configured to direct a second reflection of the signal away from the detector, wherein each of the plurality of grooves comprises a first groove sidewall parallel to the first sidewalls of the first aperture and a second groove sidewall oriented at an acute angle with the first groove sidewall.

2. The sensor package of claim 1, wherein the signal comprises an optical signal.

3. The sensor package of claim 1, wherein the detector comprises a photo-detector.

4. The sensor package of claim 1, wherein the first reflection of the signal comprises a reflection of the signal off an object external to the sensor package.

5. The sensor package of claim 1, further comprising a window and an airgap disposed between the window and the plurality of grooves of the isolator.

6. The sensor package of claim 5, wherein the second reflection comprises a reflection of the signal off a surface of the window directed towards the detector, the source, and the isolator.

7. The sensor package of claim 5, wherein the window comprises a cover glass of a device.

8. The sensor package of claim 5, wherein a nearest point of each of the plurality of grooves to the window is a first distance, wherein a farthest point of each of the plurality of grooves to the window is a second distance, wherein a surface of the optical encapsulant in a periphery region of the optical encapsulant is farther than the first distance.

9. The sensor package of claim 8, wherein the surface of the optical encapsulant in the periphery region is nearer than the second distance.

10. A device, comprising:
    a sensor package, comprising:
        an optical source configured to emit a beam of photons;
        an optical detector configured to receive a reflection of the beam of photons off an object external to the device;
        a module cap encompassing the optical source and the optical detector and defining an exterior surface of the sensor package, the module cap having a central portion disposed between the optical source and the optical detector and a peripheral portion disposed around the optical source and the optical detector, the central portion of the module cap having at least one surface directed away from the optical detector;
        a first aperture extending completely through the module cap and aligned with the optical source, the first aperture defining an emission cone of the sensor package; and
        a second aperture extending completely through the module cap and aligned with the optical detector, the second aperture defining a field-of-view of the sensor package, wherein a maximum thickness of the central portion of the module cap is higher than a maximum thickness of the peripheral portion of the module cap, wherein the central portion of the module cap comprises a plurality of grooves.

11. The device of claim 10, wherein an angle subtended between a surface normal of the at least one surface and a plane occupied by the optical source is less than 90 degrees.

12. The device of claim 10, wherein the at least one surface of the module cap comprises a saw-tooth surface.

13. The device of claim 10, wherein the at least one surface comprises a plurality of surfaces, and wherein surface normals of the plurality of surfaces are parallel.

14. The device of claim 10, wherein the at least one surface of the module cap is configured to direct a parasitic beam of photons away from the optical detector.

15. The device of claim 14, further comprising a cover glass and an airgap disposed between the cover glass and the sensor package, wherein the parasitic beam of photons comprises a reflection of the beam of photons off a surface of the cover glass facing the sensor package.

16. The device of claim 10, further comprising at least one of a cell phone, a game console, a digital tablet, a laptop computer, an infant-monitoring device, or a motion-activated camera.

17. A method of forming a sensor package, the method comprising:
    attaching a source to an attachment pad, the source configured to emit a beam of radiation, over a substrate;
    attaching a detector to the attachment pad, detector configured to receive a first reflection of the beam of radiation, over the substrate; and
    encapsulating the attachment pad, the source, the detector with an optical encapsulant while forming a first aperture and a second aperture, the optical encapsulant comprising an isolation structure between the source and the detector, the isolation structure comprising a plurality of grooves comprising one or more surfaces having a one or more surface normals directed away from the detector, wherein the first aperture extends completely through the optical encapsulant to an exposed outer surface of the sensor package, the first aperture comprising first sidewalls extending away from a major surface of the source, wherein the second aperture extends completely through the optical encapsulant to the outer surface of the sensor package, the second aperture comprising second sidewalls extending away from a major surface of the detector, wherein each of the plurality of grooves comprises a first groove sidewall parallel to the first sidewalls of the first aperture and a second groove sidewall oriented at an acute angle with the first groove sidewall.

18. The method of claim 17, wherein the one or more surfaces of the isolation structure are configured to direct one or more second reflections of the beam of radiation away from the detector.

19. The method of claim 17, wherein an angle subtended between the one or more surface normals and a plane occupied by the source is less than about 90 degrees.

20. The method of claim 17, the method further comprising disposing the sensor package in a device, the sensor package being configured to detect a presence of an object within a vicinity of the device.

* * * * *